United States Patent
Mak

(10) Patent No.: US 7,809,764 B2
(45) Date of Patent: Oct. 5, 2010

(54) METHOD AND APPARATUS FOR PRESERVING DEPENDANCIES DURING DATA TRANSFER AND REPLICATION

(75) Inventor: Wing Chit Mak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1098 days.

(21) Appl. No.: 10/979,855

(22) Filed: Nov. 1, 2004

(65) Prior Publication Data

US 2006/0101452 A1    May 11, 2006

(51) Int. Cl.
*G06F 7/00* (2006.01)
*G06F 17/30* (2006.01)

(52) U.S. Cl. .................. 707/802; 707/752; 707/809

(58) Field of Classification Search ............. 707/100, 707/200, 752, 802, 809
See application file for complete search history.

(56) References Cited

U.S. PATENT DOCUMENTS

| | | | | |
|---|---|---|---|---|
| 5,581,753 A * | 12/1996 | Terry et al. | ................. | 707/201 |
| 6,154,816 A * | 11/2000 | Steely et al. | ................. | 711/150 |
| 6,370,681 B1 * | 4/2002 | Dellarocas et al. | .......... | 717/110 |
| 7,240,054 B2 * | 7/2007 | Adiba et al. | ................... | 707/4 |
| 7,363,633 B1 * | 4/2008 | Goldick et al. | ............. | 719/328 |
| 7,386,752 B1 * | 6/2008 | Rakic et al. | .................... | 714/2 |
| 2004/0268302 A1 * | 12/2004 | Srivastava et al. | ........... | 717/108 |
| 2005/0193041 A1 * | 9/2005 | Bourbonnais et al. | ....... | 707/204 |
| 2005/0262432 A1 * | 11/2005 | Wagner | ...................... | 715/511 |

OTHER PUBLICATIONS

Rolfe, Timothy; "Mar02: Algorithm Alley: Graph Traversals"; Mar. 1, 2002; Architecture & Design; pp. 1-6 http://www.ddj.com/architect/184404999?pgno=1.*

* cited by examiner

*Primary Examiner*—Apu M Mofiz
*Assistant Examiner*—Jared M Bibbee
(74) *Attorney, Agent, or Firm*—Woodcock Washburn LLP

(57) ABSTRACT

Database objects, having interdependent relationships, are transferred for replication from a publisher to a subscriber in the order of a topological sort using a depth first search algorithm. When the depth first search algorithm attempts to enumerate all outgoing edges (dependencies) of a given node (database object), a request is made to begin an atomic transaction and then a temporary copy (e.g., via a T-SQL command) of the node/database object is created under a different name. The temporary copy is used to store dependency information that could otherwise be impaired by the replication process. Dependencies amongst database objects are thus preserved during the replication process through use of the temporary copy, as well as by transferring the database objects according to the topological sort order.

25 Claims, 8 Drawing Sheets

METHOD AND APPARATUS FOR PRESERVING DEPENDANCIES DURING DATA TRANSFER AND REPLICATION

FIELD OF THE INVENTION

The present invention relates generally to the field of data replication and data transfer, and more particularly to an elegant method and apparatus for preserving data dependencies during data replication and data transfer.

BACKGROUND OF THE INVENTION

With the rise of computer automation, data processing, manipulation and its use have become fundamental aspects of a multitude of everyday activities. Often, it is advantageous to replicate or transfer larges stores of data, so that, for example, the data can be found in more than one network location. Replication may ensure that a corruption event suffered at one location does not cause information loss, because the data can be recopied from an uncorrupted location. Similarly, data transfer may facilitate data reporting from a new location and, consequently, to more than one group or cluster of computer users.

The integrity of data generated via replication or transfer, however, is often compromised by the loss of data dependency information, particularly, though not exclusively, when the database being copied or transferred conforms to the relational data model. As is well known in the art, the tables, columns and views that may characterize a relational database are often interdependent, and these data dependencies are required to accurately extract the information contained in a database. Therefore, when transferring object schemas such as tables, views, functions, and stored procedures from one database to another, it is necessary to ensure that that the objects are transferred in an order that does not violate their interdependencies. For example, if a view "V1" is dependent upon a view "V2," which in turn is dependent upon a table "T1," it is necessary to transfer the objects in the following order: T1, V2, V1. Otherwise, an object, dependent upon another, will be transferred without information that is necessary to define the object, leading to errors. Furthermore, even if database objects are transferred in the correct order, dependency information will often be lost during data transfer as a result of the deletion and recreation of database objects that other database objects are dependent upon. In the above example, even if "T1" is correctly transferred before "V2," the deletion and recreation of "T1" attendant to the replication/transfer process may impair in formation that reflects the dependent relationship between "V2" and "T1."

Thus, there is a need for a method and apparatus for preserving data dependencies during data replication/transfer that both ensures data is transferred in the correct order and addresses the problem of deletion and recreation of database objects that other database objects are dependent upon.

SUMMARY OF THE INVENTION

The present invention satisfies this need.

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

One embodiment of the present invention resides in a method for transferring data in a computing environment. The first step of the method is opening a temporary database transaction and creating a temporary copy of at least a first database object of a plurality of database objects. The database objects are contained in a database stored on a storage medium. The database also contains a second database object that is dependent upon the first database object. The database also contains at least a third database object, where the first database object is dependent upon the third database object.

The second step of the method is initiating a transfer of the first database object using the temporary copy of the first database object. This transfer of the first database object occurs before a transfer of the second database object and after a transfer of the third database object.

The third step of the method is terminating the temporary database transaction.

In accordance with another aspect of the present invention, the method may also include the step of performing a topological sort of the plurality of database objects. The topological sort ensures that the transfer of the first database object occurs before the transfer of said second database object and after the transfer of the third database object. The topological sort may be a sort resulting from a depth first search of database objects.

One advantage of the present invention is that it provides a way of replicating and transferring data while preserving data dependency information characterizing the data.

Further advantages of the present invention should become apparent from the detailed description below.

DETAILED DESCRIPTION OF EMBODIMENTS

Definitions

As used herein, the terms "source" or "publisher" refer to a computer or database from which data is copied or transferred. The terms "destination" or "subscriber" refer to a computer or database to which such data is transferred.

Data Preparation

The present invention is particularly useful for preserving data dependencies when transferring relation database data, though by no means is it limited such data transfer. In accordance with an embodiment of the present invention, prior to data transfer, the interrelated data of a relational database is first represented in a computer environment by a "Digraph" or "Directed Graph" data structure.

"Digraphs" and "graphs" are data structures known in the art that can be represented in a variety of computing environments. A "digraph" is a specific type of "graph." Informally, a "graph" is a computer data structure that can be thought of as a set of finite points connected by lines. A "digraph" or "directed graph" can be thought of as a set of points connected by arrows. A "digraph" is thus a computer based data structure that allows the retention of information reflecting not only the existence of a relationship between entities, but also any "direction" associated with such relationship (e.g., identifying which entity is a parent and which is a child).

A digraph can also be expressed as specific type of graph in a more formal mathematical manner. Formally, a graph is a pair ("N", "E") where N is a finite set whose elements are called "Nodes", and "E" is a set of subsets of "N" of order two representing relationships among pairs of nodes. The elements of the set E are called "edges." The set "N" can be denoted $\{n_1, n_2, \ldots n_n\}$, while the set "E" can be denoted $\{(n_i, n_j), (nk, n_i) \ldots \}$.

For example, a graph may have seven nodes, "1," "2," "3," "4," "5," "6," and "7." In that case, the set of nodes "N"=$\{1, 2, 3, 4, 5, 6, 7\}$. Assume also that node "1" is related to both nodes "2" and "3," that node "2" is related to both nodes "4" and "5" and that node "3" is related to both nodes "6" and "7." In that case, the set of edges "E"=$\{(1,2), (1,3), (2,4), (2,5), (3,6), (3,7)\}$.

Figure 1:
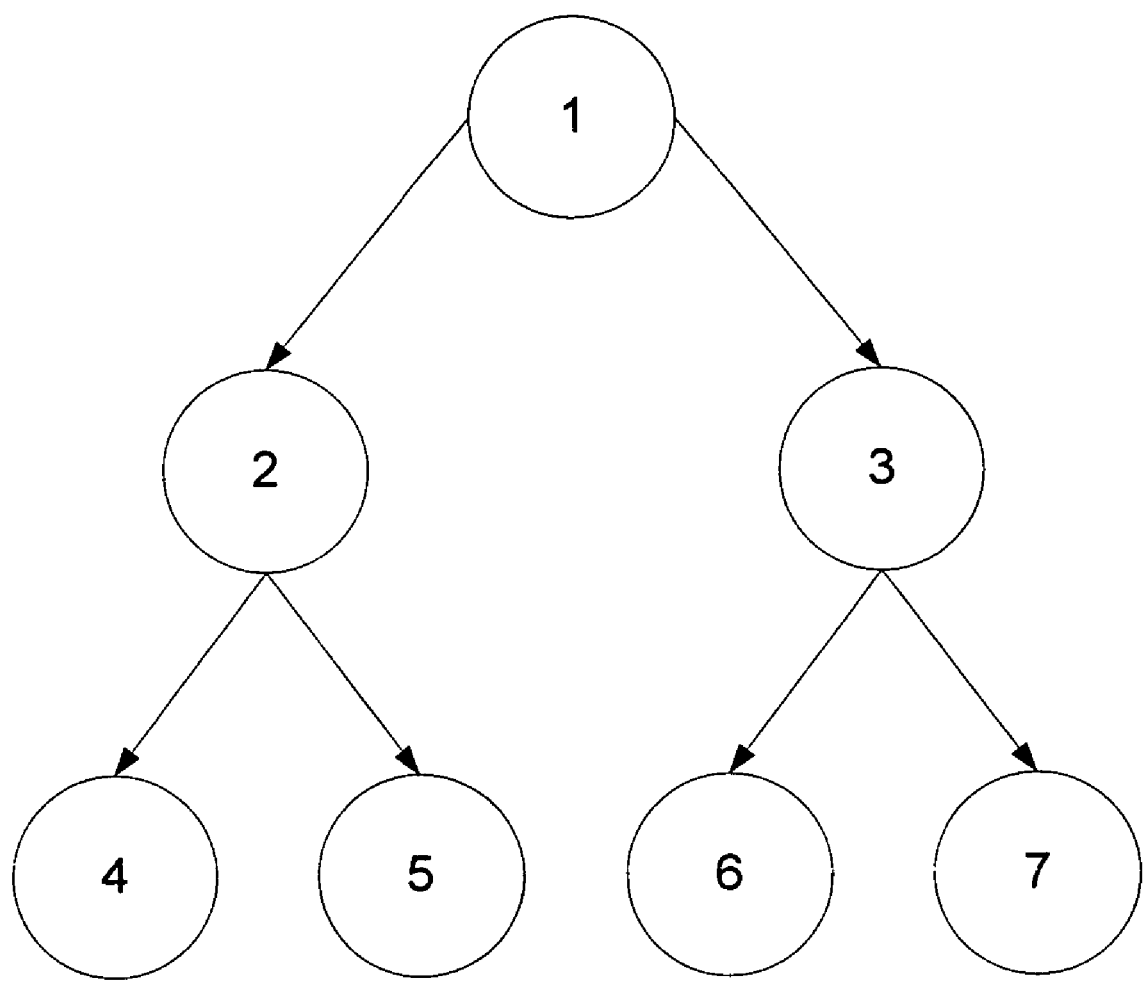
FIG. 1 is block diagram illustrating a directed graph representing the interrelated objects of a relational database in accordance with an embodiment of the present invention.

A "digraph" is similarly a pair ("N", "E") where N is a finite set of nodes, and "E" is a set of edges, each of which is an ordered pair ("x","y"), that is, a pair that specifies direction, where "x" is called the "head" and "y" is called the "tail." A digraph corresponding to the example above would, like the graph described above, be defined by ("N","E"), where "N"=$\{1,2,3,4,5,6,7\}$ and "E"=$\{(1,2), (1,3), (2,4), (2,5), (3,6), (3,7)\}$. However, the edges of "E" are not only pairs, but ordered pairs, representing not only a relationship, but a directed relationship. In the edges of "E" defined by "(1,2)" and "(1,3)", "1" would be called the "head" and "2" and "3" would be called "tails." Furthermore, "(1,2)" and "(1,3)" would specify a directed relationship (e.g., "1" is the parent of "2" and "3"). FIG. 1 illustrates a digraph corresponding to the above example.

It is well known in the art that Graphs and Digraphs can be represented in a variety computer environments using a variety of well known constructs or data structures (e.g. linked lists, adjacency lists consisting of address pointers and node information, arrays, multi-dimensional arrays, matrices, data blocks etc.) Such constructs may be stored in memory or in storage media such as a disk or CD ROM.

Turning now to FIG. 1, in accordance with an embodiment of the present invention, it illustrates a digraph representing the interrelationship among relational database objects. In the particular embodiment disclosed in FIG. 1, the nodes "N" of the digraph each represent the objects of a relational database (e.g., a table, column, view etc.) For example, in FIG. 1, each of nodes "1," "2," "3," "4," "5," "6" and "7" represent relational database tables. The edges "E" of FIG. 1 represent not only a general relationship among pairs of nodes, but more specifically the dependency of one node upon another. In the illustrative embodiment shown in FIG. 1, the "head" of each edge is dependent upon "tail" of that edge. Thus, in the embodiment illustrated in FIG. 1, node "1" is dependent upon nodes "2" and "3," node "2" is dependent upon nodes "4" and "5" and node "3" is dependent upon nodes "6" and "7." Put another way, the table represented by node "1" is dependent upon the tables represented by nodes "2" and "3," as reflected by the edges "(1,2)" and "(1,3)." The table represented by node "2," in turn, is dependent upon the tables "4" and "5," as represented by the edges "(2,4)" and "(2,5)," and so on.

In the particular embodiment disclosed in FIG. 1, the illustrated digraph is represented by an adjacency matrix, which in turn, as is well known, can be represented by a two dimensional array. An adjacency matrix "M" representing a digraph is defined as "M"=$(m_{ij})$ where $m_{ij}$="1" if there is an edge in "E" of the digraph from node $n_i$ of "N" to node $n_j$ of "N." Otherwise, $m_{ij}$ is zero. An adjacency matrix for the digraph in FIG. 1 is shown below:

$$\begin{array}{ccccccc} 0 & 1 & 1 & 0 & 0 & 0 & 0 \\ 0 & 0 & 0 & 1 & 1 & 0 & 0 \\ 0 & 0 & 0 & 0 & 0 & 1 & 1 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \\ 0 & 0 & 0 & 0 & 0 & 0 & 0 \end{array}$$

In the illustrative embodiment shown in FIG. 1, the entry in the first row and first column of the corresponding adjacency matrix is "0" because the digraph reflects no dependency relation ship between node "1" of the digraph and itself. In fact, the digraph expresses relationships amongst different nodes, not amongst the same node. Thus entries in the second row and second column, third row and third column, fourth row and fourth column, fifth row and fifth column, sixth row and sixth column, and seventh row and seventh column are all zero. Since the digraph in FIG. 1 reflects that node "1" is dependent upon nodes "2" and "3," however, the entries in the first row and second column and first row and third column are both "1." Since the digraph reflects that nodes "4," "5," "6" and "7" are not dependent on any other nodes, the fourth, fifth, sixth and seventh rows of the matrix have exclusively "0" entries, and so on.

In the embodiment shown in FIG. 1, the adjacency matrix for the digraph is represented by a two dimensional array "M[I, J]" where M is the array name, J is an index to the first array dimension, or the row the matrix, and "J" is an index to the second array dimension, or column of the matrix. The definition and declaration of two dimensional arrays has been known for decades and can be effectuated in many computer languages and computing environments.

As noted above, there are many well known ways of representing a digraph in computing environments, and the present invention is by no means limited to the use of an adjacency matrix or two dimensional array. As just one example, the adjacency matrix could itself be represented by a relational database table.

As another example, the digraph could be represented by an adjacency list. An adjacency list is a linked list indicating, for each node in the digraph, which nodes are adjacent to that node. In the adjacency list embodiment, each item in the linked list could contain at least two fields: a "node" field, and a "link" field. The node field would identify a node. The link field could contain a pointer to an adjacent node item (i.e., an edge). Each pointer field in the adjacency list would represent an edge.

An Exemplary Method for Determining a Replication Order for Database Objects

In view of the above discussion, it will be understood in the discussion below of embodiments of the present invention that when "nodes" are discussed, such "nodes" may represent any database object. Similarly, when "edges" are discussed, such "edges" may represent a dependency relationship among database objects. Furthermore, such "nodes" and "edges" may be represented in a variety of ways in a variety of computing environments.

As noted earlier, in order to preserve the dependencies amongst database objects during replication or transfer, it is advantageous to transfer the objects in a particular order. More specifically, it is advantageous to transfer objects upon which others depend before the objects that depend upon them.

One aspect of the present invention derives from the observation that the problem of finding the correct order in which to transfer a set of database objects is equivalent to running a topological sort on a digraph such as the one illustrated in FIG. 1.

Figure 2:
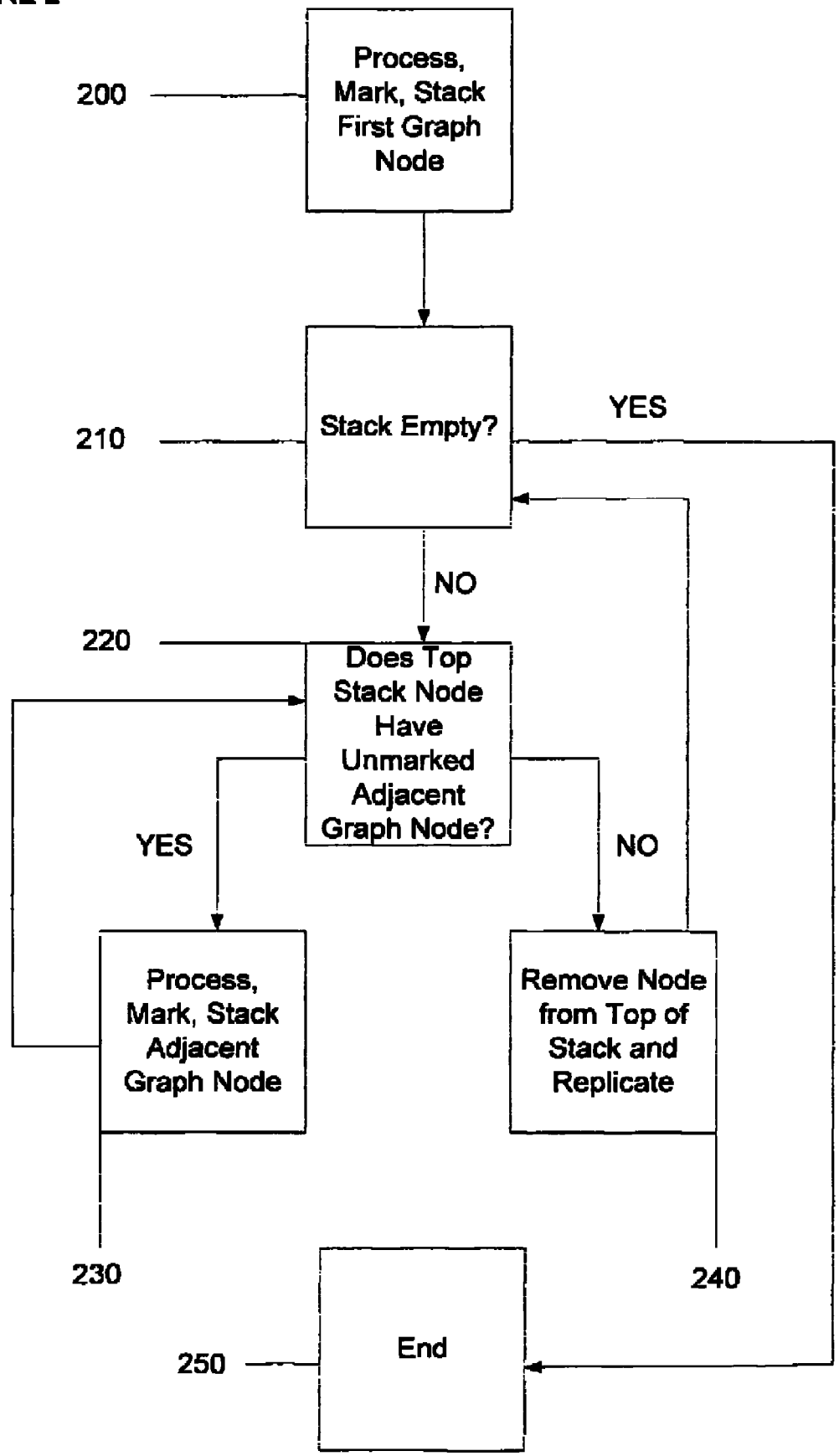
FIG. 2 is a block diagram illustrating a method for traversing or processing the interrelated objects of a relational database in accordance with an embodiment of the present invention.

Turning now to FIG. 2, in accordance with an embodiment of the present invention, it shows a computer based method for topologically sorting the digraph shown in FIG. 1 using a depth first search algorithm. In step 200, the first node is processed. In FIG. 1, the first node is node "1." Processing includes both "marking" and "stacking" the node. "Marking" simply means retaining some information (e.g. the change in value of a boolean flag) that reflects that the node has been processed.

"Stacking" means placing the node in a "stack" data structure. A "stack" is a type of data structure in which the placement of items in the stack and removal of items from the stack are governed by the "LIFO" construct. LIFO means "last in first out." Thus items are removed from the stack in an order opposite to that in which they were added in the stack. Put another way, the most recently placed item is the first removed. It is well known that a stack can be represented using a variety of computing constructs in almost any computing environment.

In Step 210, the computer based process determines whether the stack is empty. If the stack is empty then it means that either there are no nodes (i.e., database objects) in the digraph, or that all such nodes have already been transferred or replicated. Thus, in Step 250, the computer based method ends. But if the stack is not empty, it means that both the digraph and the stack have nodes and that not all of them have been transferred or replicated.

Thus, in Step 220, the computer-based method determines if the node at the "top" of the stack (i.e, the one placed most recently and that will be removed first) has an adjacent node in the digraph (i.e., a node connected by an edge) that has not been marked. If there is no such adjacent node, that means that the node at the top of the stack either has no adjacent nodes or that its adjacent nodes are marked, and therefore have already been processed and stacked. If an adjacent node has been processed, marked and stacked, it means that the adjacent node is dependent upon the node at the top of the stack because the process began with Node "1" in FIG. 1. Thus, in Step 240, the node at the top of the stack is removed from the stack and is transferred or replicated to a destination or subscriber, because there can be no nodes upon which it depends that will be later transferred. Processing then continues to Step 210 to again determine if the stack is empty.

However, if in Step 220 it is determined that there is an adjacent node in the digraph that has not been marked, it means that the node at the top of the stack is dependent upon the adjacent node because, again, the process began with Node "1" in FIG. 1. Thus, in Step 230, the adjacent node is processed, marked and placed at the top of the stack. It thus becomes the new candidate in line to be removed from the stack and replicated next. Processing continues to Step 220 to again determine if the node at the top of the stack has any unmarked adjacent nodes in the graph.

In this way, the method ensures that nodes (database objects) are transferred only after those upon which they depend.

The order of processing and transfer of database objects represented in FIG. 1, using the method of FIG. 2, is now described as an example. In the method of FIG. 2, the first node in FIG. 1, node "1," is first processed, marked and placed at the top of the stack. In Step 210, the computer based process determines whether the stack is empty. Here, it is not because it contains node "1." Thus processing continues to Step 220.

In Step 220, the computer based process determines if the node at the top of the stack has an unmarked adjacent node in the digraph. Here, it does because there is an edge between node "1" and node "2" in FIG. 1, and node "2" has not been marked. Thus processing continues to Step 230. In Step 230, node "2" is processed, marked and placed on the stop of the stack. Processing continues to Step 220.

In Step 220, the computer based process determines if node "2" has an unmarked adjacent node in the digraph. Node "4" is such an unmarked adjacent node. Thus processing continues to step 230.

In Step 230, node "4" is processed, marked and placed on top of the stack. Note that at this point the stack consists of nodes "4 2 1." Processing continues to step 220.

In Step 220, the computer based method determines if node "4" has an unmarked adjacent node in the digraph. It does not. Thus processing continues to step 240.

In Step 240, node "4" is removed from the top stack and replication and transfer of node "4" is initiated. Processing continues to Step 210.

In Step 210, the computer based method determines if the stack is now empty. It is not because node "2" is now at the top of the stack and node "1" is below it. Processing thus continues to Step 220.

In Step 220, the computer based process determines that node "2" has an unmarked adjacent node (node "5"). In Step 230, node "5" is processed, marked and stacked. Note that the stack now consists of nodes "5 2 1."

In Step 220, the computer based method determines that node "5" does not have an unmarked adjacent node. In Step 240 node "5" is removed from the stack and transferred for replication.

In Step 210, the computer process determines that the stack is not empty and in step 220, it determines that node "2," now the top stack node, has no unmarked adjacent digraph node at this point. Node "2" is removed from the stack and its replication is initiated in Step 240.

In Step 210, the computer process determines that the stack is not empty and in step 220, it determines that node "1," now the top stack node, has an unmarked adjacent node (node "3"). In Step 230, node "3" is processed, marked and stacked, and so.

Thus, it can be seen that according to the algorithm of FIG. 2, the nodes (database objects) of FIG. 1 will be transferred in the following order: 4, 5, 2, 6, 7, 3, 1. Again, in FIG. 1, node "1" is dependent upon nodes "2" and "3," node "2" is dependent upon nodes "4" and "5" and node "3" is dependent upon nodes "6" and "7." Thus, in each case, nodes (database objects) are transferred only after those upon which they depend.

The above-disclosed depth first search algorithm can also be implemented in a variety of other ways. For example, in accordance with one aspect of an embodiment of the present invention, a depth first search can be performed on an adjacency list implementation of a digraph using a recursive algorithm, as exemplified by the following source code excerpt:

```
Private void DepthFirstSearchVisit(IDependencyNode dependencyNode)
{
    m_DepthFirstSearchStack.Push(dependencyNode);
dependencyNode.MarkGrey( );
foreach (IDependencyNode dependentNode in
dependencyNode.AdjacencyList)
{
if (dependentNode.IsWhite)
{
    DepthFirstSearchVisit(dependentNode);
}
}
dependencyNode.MarkBlack( );
m_DepthFirstSearch.Pop( );
}
```

In this embodiment, a stack is used for cycle detection and a node is added to an object creation list when it is marked black.

In addition, in some implementations of the present invention, the order of the steps of the embodiment illustrated in FIG. 2 can be altered. For example, Step 240 of FIG. 2 illustrates how a database object is replicated as soon as its corresponding node is removed from the stack (i.e., as soon as the depth first search algorithm determines that there are no unmarked adjacent nodes).

But in another aspect of an embodiment of the present invention, replication need not take place "on-the-fly" during the topological sort. In accordance with this aspect, the database object is not replicated as soon as the depth first search algorithm determines that the database object is next in order to be transferred. Instead, once the topological sort determines that a database object is next in-line to be replicated or transferred, the placement of the database object in the order of transfer is saved for later use. Replication or transfer of all the database object is not initiated until after the placement of each database object is determined.

An Exemplary Method for Replicating Database Objects

Figure 3:
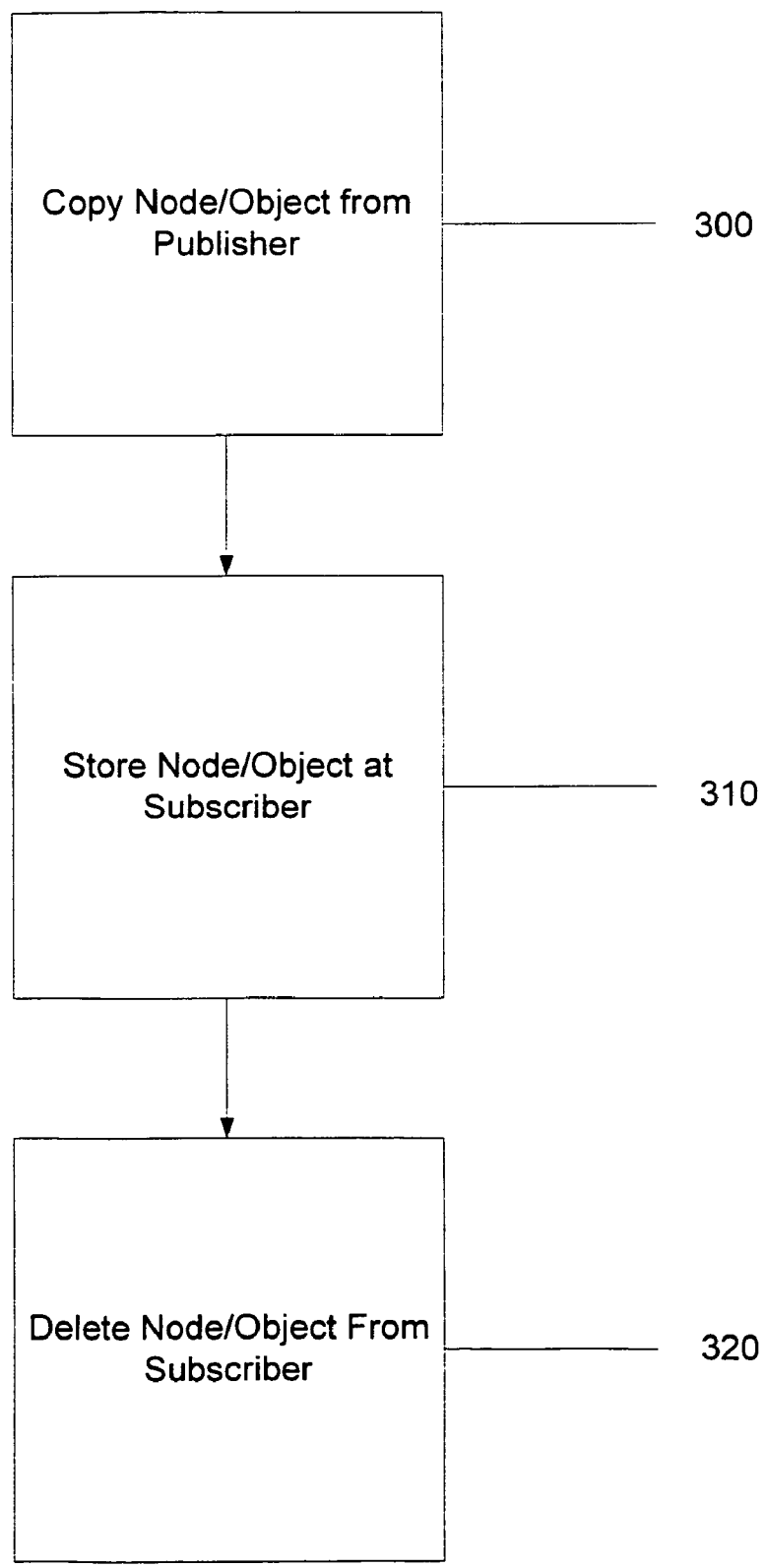
FIG. 3 is a block diagrams illustrating a method for replicating or transferring objects of a relational database as they are processed or traversed in accordance with an aspect of the present invention.

Turning now to FIG. 3, it shows in greater detail the step of replicating or transferring database objects shown in block 240 of FIG. 2. In step 300, after the node representing a database object is removed from the stack, the data object is copied from the publisher or source computer. In Step 310 the copy is stored on the subscriber or destination computer. Finally, in Step 320, the copy may be deleted from one or more locations of the publisher or source computer.

Another Exemplary Method for Determining a Replication Order for Database Objects In the depth first search example shown above, an embodiment of the present invention was shown to advantageously cause the transfer of interdependent database objects in the correct order, one which allows the preservation of dependency information. However, transferring database objects in the proper order does not guarantee that data dependencies will be preserved.

For instance, in the example above, the database objects of FIG. 1 were transferred in the order "4, 5, 2, 6, 7, 3, 1." Each object was transferred in the correct order. But even though node "4" was correctly transferred before node "2," the deletion and recreation of node "4" attendant to the replication or transfer process may impair information on the publisher that reflects the dependent relationship between node "2" and node "4." More specifically, when node "4" is deleted and recreated, critical information reflecting the dependence of node "2" upon node "4" may be impaired on the publisher. When node "2" is later transferred, the impaired information may be transferred with it.

Figure 4:
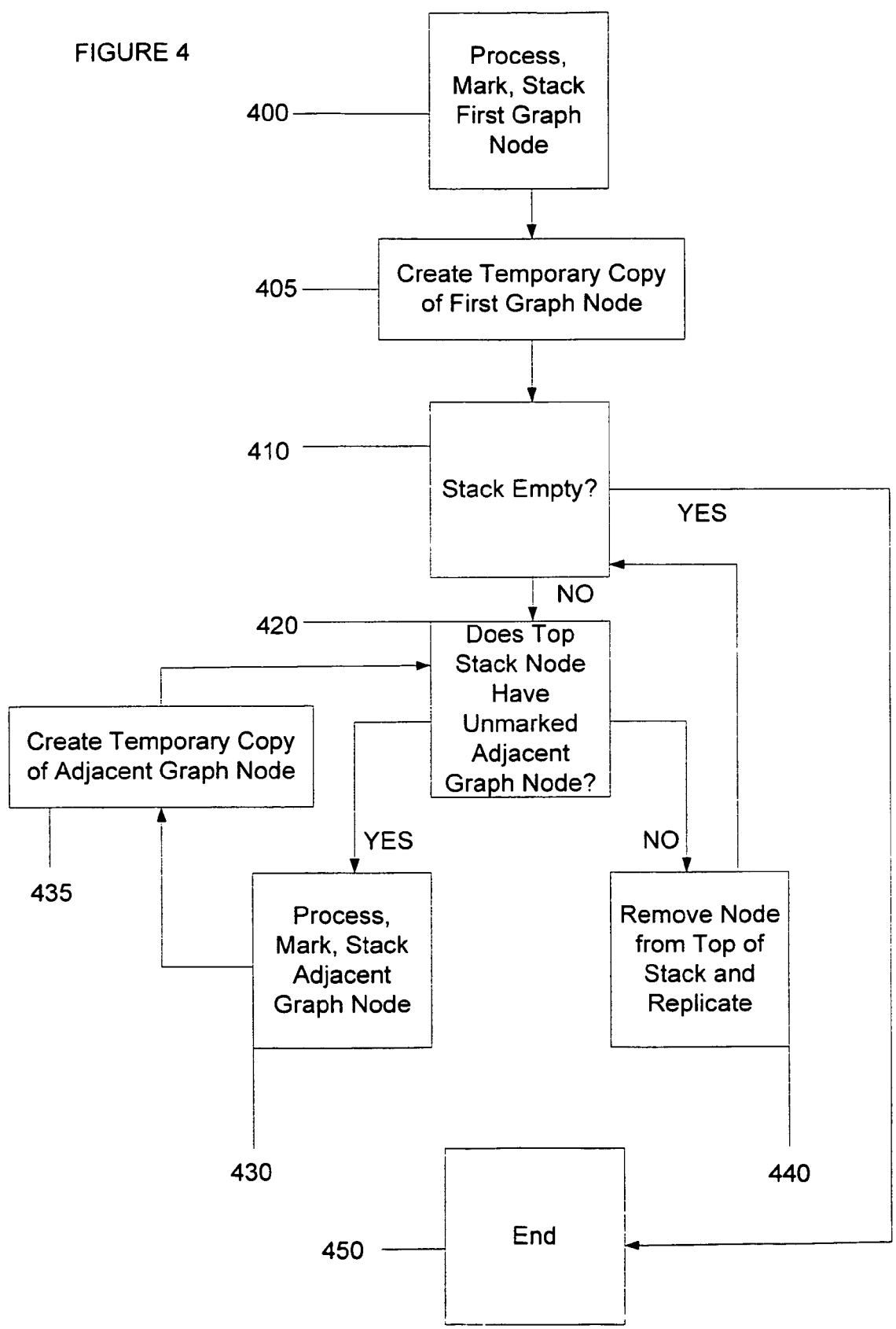
FIG. 4 is a block diagram illustrating another method for traversing or processing the interrelated objects of a relational database in accordance with an embodiment of the present invention.

Turning now to FIG. 4, it illustrates a method for traversing the interrelated objects of a relational database that addresses the problem of dependency information loss attendant to the deletion and recreation of database objects that other objects are dependent upon. FIG. 4 differs from FIG. 2 in that steps 405 and steps 435 have been added. In general, in FIG. 4, when the depth-first search algorithm attempts to enumerate all outgoing edges (dependencies) of a given node (database object), a request is made to begin an atomic transaction and then a temporary copy (e.g., via a T-SQL command) of the node/database object is created under a different name. Once the temporary object is successfully created, the dependency information of the temporary object is retrieved and the transaction is rolled back thereby leaving no trace of the temporary object behind. Assuming the temporary copy is initiated via a T-SQL command, then the temporary copy will have the same T-SQL text definition as the original object. The temporary copy will also have the same dependencies as the original object. In addition, the dependency information of the temporary copy must be accurate at the moment of creation because the object that it is dependent upon stays unchanged for the duration of the transaction. Thus, the dependency information of the temporary object can be used as accurate dependency information of the original object.

In FIG. 4, in Step 400 a computer based method processes, marks and stacks a first node of a digraph. Unlike FIG. 2, in Step 405 of FIG. 4, a temporary copy of the first graph node is initiated. The dependency information of the temporary copy must be accurate at the moment of creation because the object that it is dependent upon stays unchanged for the duration of the transaction. In Step 410, the computer based method determines if the stack is empty. If the stack is empty, then in step 450 the process ends. If the stack is not empty, then in Step 420, the computer process determines if the top stack node has an adjacent unmarked node in the digraph. If there is such an unmarked adjacent node, then (1) in Step 430, the unmarked adjacent node is processed, marked, stacked, (2) in step 435, a temporary copy is made of the adjacent unmarked node and (3) processing continues back to step 420. If there is no such adjacent unmarked node, then in step 440, (1) the top stack node is removed from the stack and a transfer of the top stack node is initiated and (2) processing continues to step 410.

The order of processing and transfer of database objects represented in FIG. 1, using the method of FIG. 4, is now described as an example.

In the method of FIG. 4, the first node in FIG. 1, node "1," is first processed, marked and placed at the top of the stack. In Step 405, a temporary copy of node "1" is created.

In Step 410, the computer based process determines whether the stack is empty. Here, it is not because it contains node "1." Thus processing continues to Step 420.

In Step 420, the computer based process determines if the node at the top of the stack has an unmarked adjacent node in the digraph. Here, it does because there is an edge between node "1" and node "2" in FIG. 1, and node "2" has not been marked. Thus processing continues to Step 430.

In Step 430, node "2" is processed, marked and placed on the stop of the stack. In Step 435, a temporary copy of node "2" is created. Processing continues to Step 420.

In Step 420, the computer based process determines if node "2" has an unmarked adjacent node in the digraph. Node "4" is such an unmarked adjacent node. Thus processing continues to step 430.

In Step 430, node "4" is processed, marked and placed on top of the stack. In Step 435, a temporary copy of node "4" is created. Processing continues to step 420.

In Step 420, the computer based method determines if node "4" has an unmarked adjacent node in the digraph. It does not. Thus processing continues to step 440.

In Step 440, node "4" is removed from the top stack and replication and transfer of node "4" is initiated. Processing continues to Step 410. Note that a temporary transaction has been opened for node "2," and the dependency information for node "2" stored in the temporary copy is not impaired by deletion and recreation attendant to replication of node "4."

In Step 410, the computer based method determines if the stack is now empty. It is not because node "2" is now at the top of the stack and node "1" is below it. Processing thus continues to Step 420.

In Step 420, the computer based process determines that node "2" has an unmarked adjacent node (node "5"). In Step 430, node "5" is processed, marked and stacked. In Step 435, a temporary copy of node "5" is created. Processing continues to step 420.

In Step 420, the computer based method determines that node "5" does not have an unmarked adjacent node. In Step 440 node "5" is removed from the stack and transferred for replication. Processing continues to step 410. Note that a temporary transaction has been opened for node "2," and the dependency information for node "2" stored in the temporary copy is not impaired by deletion and recreation attendant to replication of node "5."

In Step 410, the computer process determines that the stack is not empty and in step 420, it determines that node "2," now the top stack node, has no unmarked adjacent stack node at this point. Node "2" is removed and its replication is initiated in Step 440, and so on. A temporary transaction has been opened for node "1," and the dependency information for node "1" stored in the temporary copy is not impaired by deletion and recreation attendant to replication of node "2."

As with FIG. 2, in the method of FIG. 4, in each case, nodes (database objects) are transferred only after those upon which they depend.

As noted earlier, the depth first search algorithm disclosed in FIG. 4 can also be implemented in a variety of other ways, including a recursive algorithm performed on an adjacency list, as exemplified by the earlier described source code excerpt.

Also the order of the steps of the embodiment illustrated in FIG. 4 can be altered. For example, Step 440 of FIG. 4 illustrates how a database object is replicated as soon as its corresponding node is removed from the stack. But in another aspect of an embodiment of the present invention, the database object is not replicated as soon as the depth first search algorithm determines that the database object is next in order to be transferred. Instead, as noted earlier, replication or transfer of all the database object can be deferred until after the order placement of each database object is determined.

Another Exemplary Method for Replicating Database Objects

Figure 5:
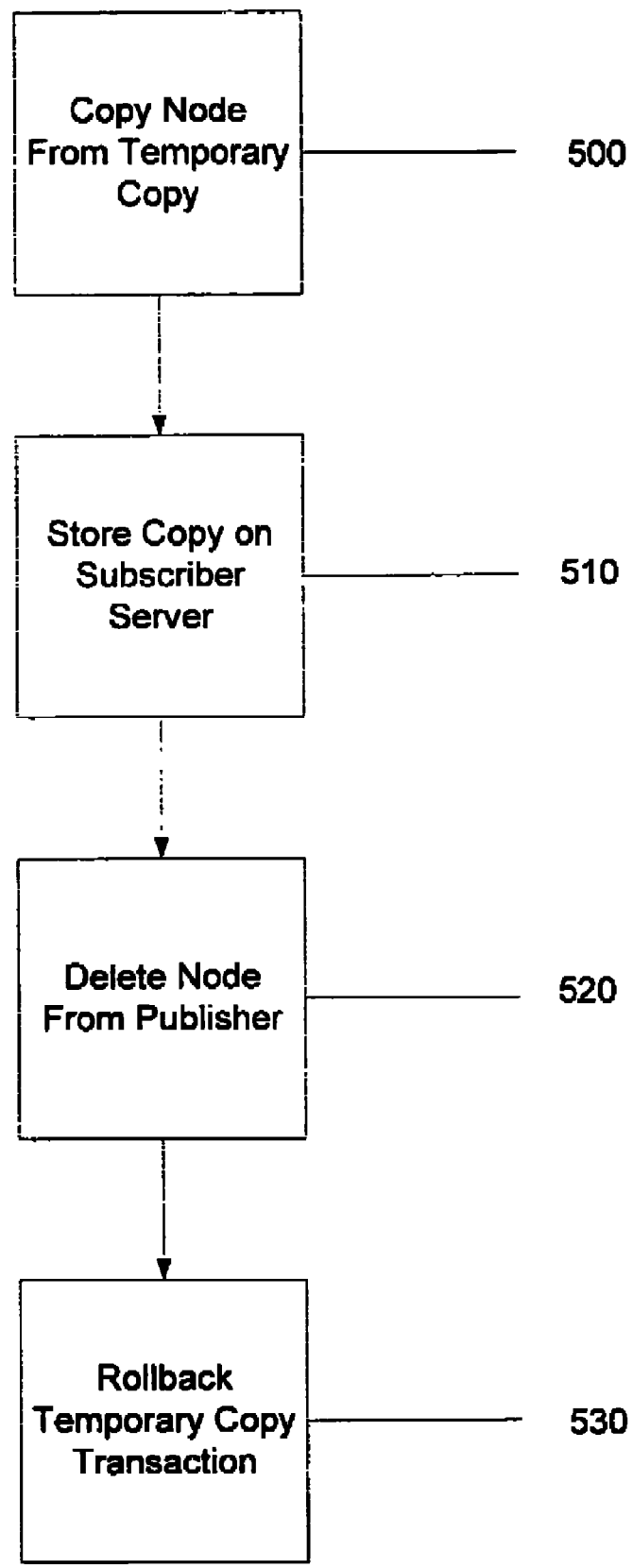
FIG. 5 is a block diagrams illustrating another method for replicating or transferring objects of a relational database as they are processed or traversed in accordance with an aspect of the present invention.

Turning now to FIG. 5, it shows in greater detail the step of replicating or transferring database objects shown in block 440 of FIG. 4. In step 500, after the node representing a data object is removed from the stack, the database object is copied from the publisher or source computer using the temporary copy created for the database object. As described above, the temporary copy contains accurate data dependency information. In Step 510 the copy is stored on the Subscriber or destination computer. In Step 520, the copy is deleted from one or more locations of the publisher or source computer. Finally, in Step 530, the temporary copy transaction for the database object is terminated.

Exemplary Operating Environment

Figure 6:
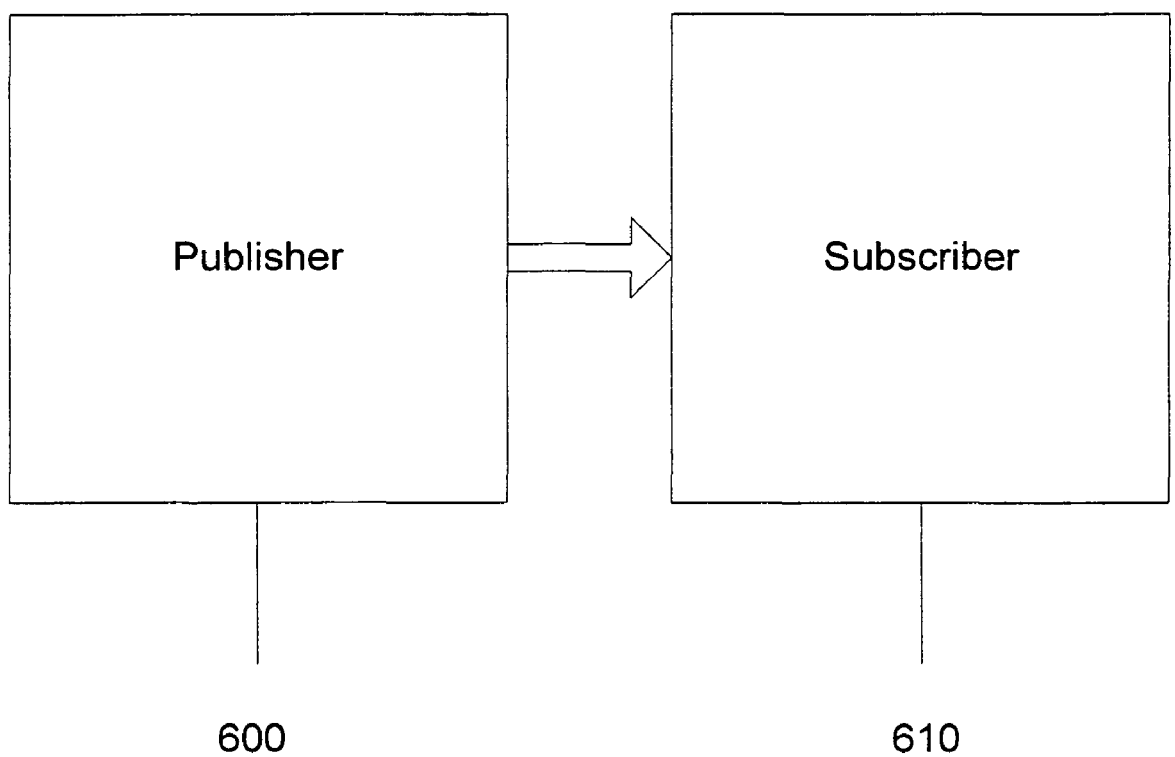
FIG. 6 is a block diagram illustrating on a high level an exemplary architecture environment in which embodiments of the present invention may effect replication and transfer of data.

Turning now to FIG. 6, it illustrates on a high level an exemplary architecture environment in which embodiments of the present invention may effect replication and transfer of data. In an embodiment of the present invention, the data transfer occurs in a Microsoft® SQL Server™ programming environment and the database objects transferred are SQL database objects. In a Microsoft® SQL Server™ programming environment embodiment of the present invention, replication of a database, including the steps of FIGS. 4 and 5, is initiated by a network administrator using a "Replication Wizard" option provided by a Microsoft® SQL Server™ GUI ("Graphical User Interface").

During replication, data transfer occurs from a publisher 600 to a subscriber 610. The publisher 600 is a server or database that sends its data to another server or database. The subscriber 610 receives data form the publisher 600.

Microsoft® SQL Server™ provides various types of database replication options, including snapshot replication, transactional replication and merge replication. Snapshot replication distributes data exactly as it appears at a specific moment in time and does not monitor for updates to the data. With transactional replication, an initial snapshot of data is applied at the subscriber, and then when data modifications are made at the publisher, the individual transactions are captured and propagated to the subscriber. Merge replication is the process of distributing data from the publisher to the subscriber, allowing both the Publisher and the Subscriber to make updates, and then merging the updates between the publisher and the subscriber when both are connected.

In the Microsoft® SQL Server™ environment, the steps of creating a temporary database object copy in blocks 405 and 435 of FIG. 4, and the steps of using the temporary copy transaction and terminating it in blocks 500 and 530 of FIG. 5, may be performed using T-SQL (Transact-SQL). Transaction SQL is a set of programming extensions provided by Microsoft that adds several features to standard SQL. These supplemental features include transaction control, relational database table row processing and support for declared variables. Database management tools such as the SQL Distributed Management Object Model (SQLDMO) and the SQL Management Object Model (SMO) provide the capability of scripting the T-SQL definitions of database objects under different object names. In an embodiment of the present invention, a T-SQL script generated from SMO is used for the purpose of creating the temporary object as illustrated in blocks 405 and 435 of FIG. 4.

Figure 7:
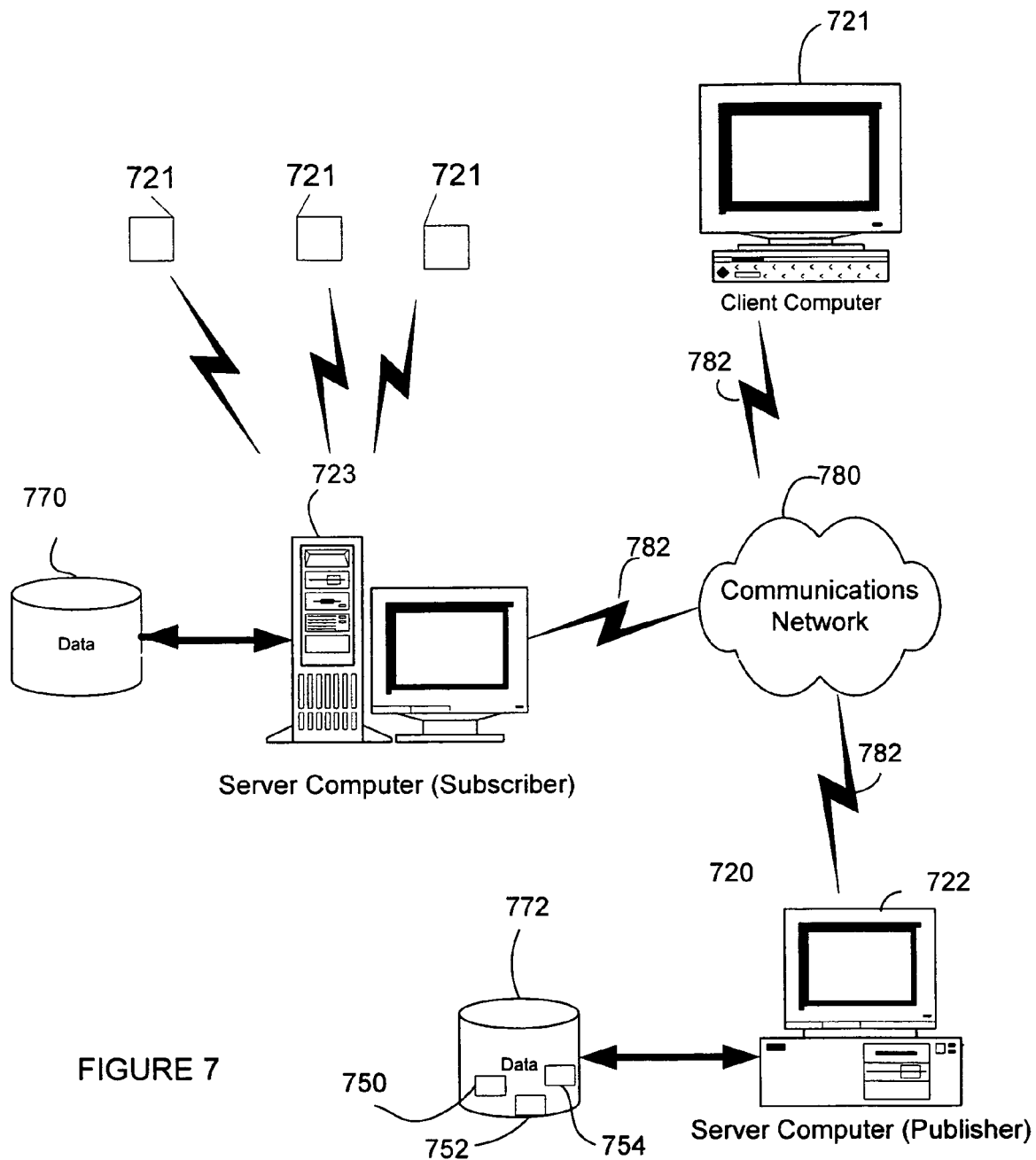
FIG. 7 is a block diagram illustrating an exemplary network environment in which embodiments of the present invention may be implemented.

Turning now to FIG. 7, it illustrates an exemplary network environment in which an embodiment of the invention may be implemented. The operating environment in FIG. 7 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, and other distributed computing environments that include any of the above systems or devices, and the like.

In the exemplary environment of FIG. 7, the network may include client computers 721, a server (publisher) computer 722, and server (subscriber) computer 723. Server (publisher) computer 722 has an associated database 772. Server (subscriber) computer 723 also has an associated database 770.

The client computers 721 and the server computers 722 723 are in electronic communication via communications network 780, e.g., the Internet. Client computers 721 and server computers 722 723 are connected to the communications network by way of communications interfaces 782. Communications interfaces 782 can be any one of the well-known communications interfaces such as Ethernet connections, modem connections, and so on.

Server computers 722 723 provide management of databases 770 772 by way of database server system software, which may conform, for example, to the relational data model. Such database software may be, for example, Microsoft® SQL Server™ software. As such, servers 722 723 act as a storehouse of data and provide that data to a variety of data consumers.

Client computers 721 that desire to use the data stored by server computers 722 723 can access the databases 770 772 via communications network 780. Client computers 721 request the data by way of queries.

In the example of FIG. 7, a network administrator may want to replicate the database 772, which consists of data stored in tables 750, 752, and 754, and transfer the tables to database 770. In this way, reporting may be more easily facilitated to a greater cluster of client computers 721, from both server (publisher) computer 722 and server (subscriber) computer 723. To accomplish his or her task, the administrator may log into Microsoft® SQL Server™ software located on, for example, the server (publisher) computer 722. After designating database 772 as the publisher, or source of data, and database 770 as the subscriber, or destination of data, the administrator initiates a replication sequence. The database objects thus stored in database 772 are replicated in database 770. In accordance with the presently discussed embodiment, the transfer is effectuated by replication software on the server (publisher) computer 722. The replication software operates in accordance with the steps of FIGS. 1-5 and therefore preserves the dependencies amongst the database objects transferred during replication. The data ultimately stored in database 770 thus contains wholly accurate dependency information.

Figure 8:
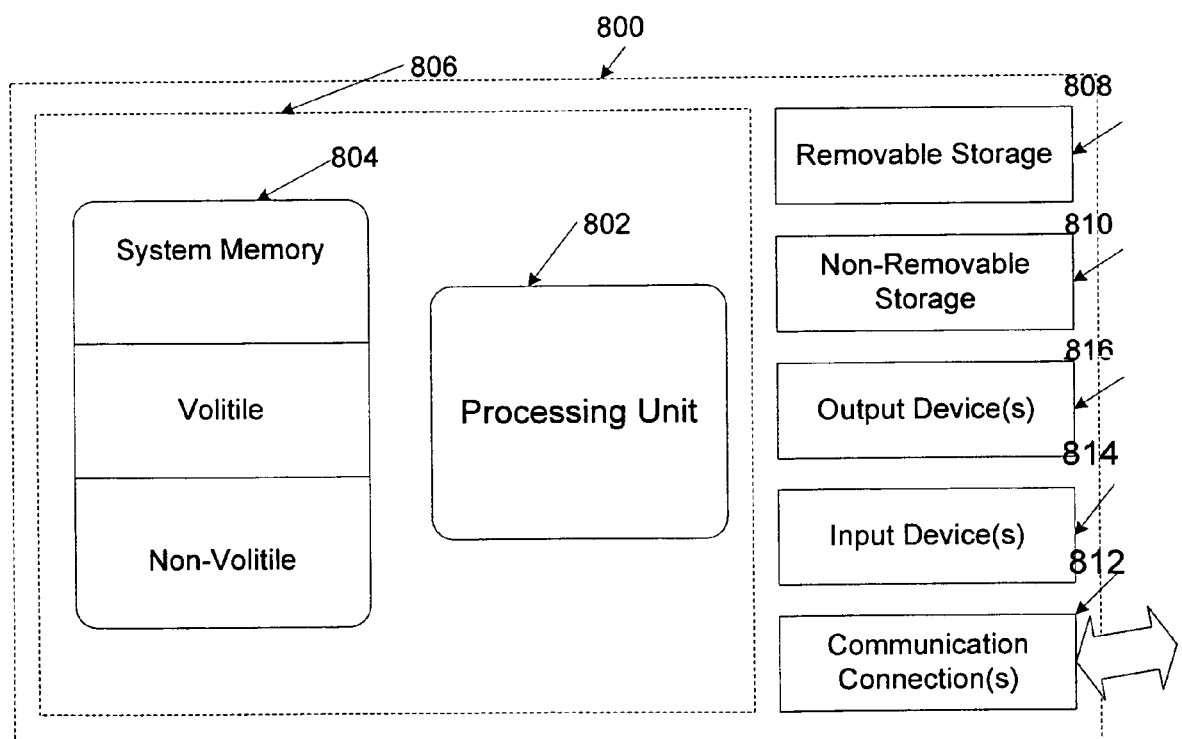
FIG. 8 is a block diagram illustrating the computing devices shown in FIG. 7 in greater detail.

Turning now to FIG. 8, an exemplary computing device 800 is shown to illustrate the client computers 721, server (publisher) computer 722 and server (subscriber) computers 723 in greater detail. In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. Additionally, device 800 may also have additional features or functionality. For example, device 800 may also include additional storage (removable and/or non-removable) including, but not limited to, magnetic or optical disks or tape. Such additional storage is illustrated in FIG. 8 by removable storage 808 and non-removable storage 810.

Computer storage media includes volatile and nonvolatile, removable and non-removable media implemented in any method or technology for storage of information such as computer readable instructions, data structures, program modules or other data. Memory 804, removable storage 808 and non-removable storage 810 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 800. In an embodiment of the present invention, executable instructions performing the steps of FIGS. 2-4 may be stored on such computer storage media.

Device 800 may also contain communications connection(s) 812 that allow the device to communicate with other devices. Communications connection(s) 812 is an example of communication media. By way of example, and not limitation, communication media includes wired media such as a wired network or direct-wired connection, and wireless media such as acoustic, RF, infrared and other wireless media.

Device 800 may also have input device(s) 814 such as keyboard, mouse, pen, voice input device, touch input device, etc. Output device(s) 816 such as a display, speakers, printer, etc. may also be included. All these devices are well know in the art and need not be discussed at length here.

While the invention has been described and illustrated with reference to specific embodiments, those skilled in the art will recognize that modification and variations may be made without departing from the principles of the invention as described above and set forth in the following claims. Accordingly, reference should be made to the appended claims as indicating the scope of the invention.

What is claimed:

1. A computing device, the computing device including:
    a processing unit;
    a temporary copy software element comprising instructions executed by the processing unit, the temporary copy software element opening a temporary database transaction and creating a temporary copy of at least a first database object of a plurality of database objects contained in a database stored on a storage medium, said first database object having first dependency information, said temporary copy having other dependency information, said first dependency and other information being the same when said temporary database transaction is opened, said database also containing at least a second database object of the plurality of database objects, said second database object being dependent upon the first database object, and said database also containing a third database object of the plurality of database objects, said first database object being dependent upon said third database object;
    a transfer software element comprising instructions executed by the processing unit, the transfer software element initiating a transfer of the first database object using said temporary copy of the first database object, said transfer of said first database object occurring before a transfer of said second database object and after a transfer of said third database object;

a transaction closure software element comprising instructions executed by the processing unit, the transaction closure software element terminating the temporary database transaction; and a topological sort software element comprising instructions executed by the processing unit, the topological sort software element performing a sort of the plurality of database objects to determine an order placement of the plurality of database objects, the topological sort software element ensuring that the transfer of said first database object occurs before the transfer of said second database object and after the transfer of said third database object, the topological sort software element performing the sort of the plurality of database objects using a depth first search algorithm of a digraph that includes both marking and stacking nodes that represent any of the database objects, creating temporary copies of a node that represents a database object and of an adjacent unmarked node, retrieving dependency information of the temporary copies, and rolling back creation of the temporary copies, the depth first search algorithm ensuring that the nodes are transferred only after all edges of a given node have been transferred and after the order placement of the plurality of database objects is determined wherein the dependency information for each temporary copy of each database object remains unchanged throughout a duration of the temporary database transaction.

2. The computing device of claim 1 wherein the depth first search algorithm is implemented using a recursive algorithm performed on an adjacency list.

3. The computing device of claim 1 wherein the database is a relational database.

4. The computing device of claim 3 wherein the relational database is an SQL database.

5. The computing device of claim 1 wherein the first database object is a relational database table.

6. The computing device of claim 1 wherein the first database object is a relational database view.

7. The computing device of claim 1 wherein the first database object is a relational database column.

8. The computing device of claim 1 wherein said first dependency information is impaired before said transfer such that said first dependency information is less accurate than said other dependency information.

9. A method for transferring data in a computing environment, the method comprising the steps of:
a. opening a temporary database transaction and creating a temporary copy of at least a first database object of a plurality of database objects contained in a database stored on a storage medium, said first database object having first dependency information, said temporary copy having other dependency information, said first dependency and other dependency information being the same when said temporary database transaction is opened, said database also containing at least a second database object of the plurality of database objects, said second database object being dependent upon the first database object, and said database also containing a third database object of the plurality of database objects, said first database object being dependent upon said third database object;
b. performing a topological sort of the plurality of database objects to determine an order placement of the plurality of database objects, said topological sort ensuring that a transfer of said first database object occurs before a transfer of said second database object and after a transfer of said third database object, the topological sort software element performing the sort of the plurality of database objects using a depth first search algorithm of a digraph that includes both marking and stacking nodes that represent any of the database objects, creating temporary copies of a node that represents a database object and of an adjacent unmarked node, retrieving dependency information of the temporary copies, copying the database object from a source computer to a destination computer using the temporary copies of the node that represents the database object, storing the copy of the database object on the destination computer, deleting the copy of the database object from at least one location of the source computer, and rolling back creation of the temporary copies, the depth first search algorithm ensuring that the nodes are transferred only after all edges of a given node have been transferred and after the order placement of the plurality of database objects is determined;
c. initiating the transfer of the first database object using said temporary copy of the first database object, said transfer of said first database object occurring before the transfer of said second database object and after the transfer of said third database object; and
d. terminating the temporary database transaction,
wherein the dependency information for each temporary copy of each database object remains unchanged throughout a duration of the temporary database transaction.

10. The method of claim 9 wherein the depth first search algorithm is implemented using a recursive algorithm performed on an adjacency list.

11. The method of claim 9 wherein the database is a relational database.

12. The method of claim 11 wherein the relational database is an SQL database.

13. The method of claim 9 wherein the first database object is a relational database table.

14. The method of claim 9 wherein the first database object is a relational database view.

15. The method of claim 9 wherein the first database object is a relational database column.

16. The method of claim 9 wherein said first dependency information is impaired before said transfer such that said first dependency information is less accurate than said other dependency information.

17. A computer-readable storage medium having computer-executable instructions for performing steps comprising:
a. opening a temporary database transaction and creating a temporary copy of at least a first database object of a plurality of database objects contained in a database stored on a storage medium, said first database object having first dependency information, said temporary copy having other dependency information, said first dependency and other dependency information being the same when said temporary database transaction is opened, said database also containing at least a second database object of the plurality of database objects, said second database object being dependent upon the first database object, and said database also containing a third database object of the plurality of database objects, said first database object being dependent upon said third database object;
b. performing a topological sort of the plurality of database objects to determine an order placement of the plurality of database objects, said topological sort ensuring that a transfer of said first database object occurs before a transfer of said second database object and after a transfer of said third database object, the topological sort software element performing the sort of the plurality of database objects using a depth first search algorithm of a digraph that includes both marking and stacking nodes that represent any of the database objects, creating temporary copies of a node that represents a database object and of an adjacent unmarked node, retrieving dependency information of the temporary copies, and rolling back creation of the temporary copies, the depth first search algorithm ensuring that the nodes are transferred only after all edges of a given node have been transferred and after the order placement of the plurality of database objects is determined, when the depth first search algorithm attempts to enumerate all edges of a given node, a request is made to begin an atomic transaction and then a temporary copy of the node is generated under a different name;

c. initiating the transfer of the first database object using said temporary copy of the first database object, said transfer of said first database object occurring before the transfer of said second database object and after the transfer of said third database object; and d. terminating the temporary database transaction, wherein the dependency information for each temporary copy of each database object remains unchanged throughout a duration of the temporary database transaction.

18. The computer-readable storage medium of claim 17 wherein the depth first search algorithm is implemented using a recursive algorithm performed on an adjacency list.

19. The computer-readable storage medium of claim 17 wherein the database is a relational database.

20. The computer-readable storage medium of claim 19 wherein the relational database is an SQL database.

21. The computer-readable storage medium of claim 17 wherein the first database object is a relational database table.

22. The computer-readable storage medium of claim 17 wherein the first database object is a relational database view.

23. The computer-readable storage medium of claim 17 wherein the first database object is a relational database column.

24. The computer-readable storage medium of claim 17 wherein said first dependency information is impaired before said transfer such that said first dependency information is less accurate than said other dependency information.

25. The computer-readable storage medium of claim 19 wherein the temporary copy of the node is performed using a T-SQL command.

* * * * *